(12) United States Patent
Koo et al.

(10) Patent No.: US 7,920,533 B2
(45) Date of Patent: Apr. 5, 2011

(54) METHOD AND APPARATUS FOR CALIBRATION AND CHANNEL STATE FEEDBACK TO SUPPORT TRANSMIT BEAMFORMING IN A MIMO SYSTEM

(75) Inventors: Chang-Soo Koo, Melville, NY (US); Jin Wang, Central Islip, NY (US); Robert Lind Olesen, Huntington, NY (US); Arty Chandra, Manhasset Hills, NY (US); Peter J. Voltz, Commack, NY (US); Chia-Pang Yen, Regal Park, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1039 days.

(21) Appl. No.: 11/680,694

(22) Filed: Mar. 1, 2007

(65) Prior Publication Data

US 2007/0206504 A1   Sep. 6, 2007

Related U.S. Application Data

(60) Provisional application No. 60/777,835, filed on Mar. 1, 2006, provisional application No. 60/780,623, filed on Mar. 9, 2006, provisional application No. 60/839,846, filed on Aug. 24, 2006.

(51) Int. Cl.
*H04W 4/00* (2009.01)
*H04B 7/00* (2006.01)
*H04B 17/00* (2006.01)
*H04B 1/00* (2006.01)

(52) U.S. Cl. ........ 370/338; 370/310; 370/328; 370/334; 455/115.1; 455/63.1

(58) Field of Classification Search .......... 370/328–350; 455/69, 115.1, 60–63.1

See application file for complete search history.

(56) References Cited

U.S. PATENT DOCUMENTS

2003/0002450 A1   1/2003   Jalali et al.

(Continued)

FOREIGN PATENT DOCUMENTS

WO   99/57820   11/1999

(Continued)

OTHER PUBLICATIONS

3GPP, "3$^{rd}$ Generation Partnership Project; Technical Specification Group Radio Access Network; Physical Layer Aspects for Evolved UTRA," 3GPP TR 25.814 V1.0.3, (Feb. 2006).

(Continued)

*Primary Examiner* — Kamran Afshar
*Assistant Examiner* — Kathy Wang-Hurst
(74) *Attorney, Agent, or Firm* — Volpe and Koenig, PC

(57) ABSTRACT

A method and apparatus for calibration and channel state feedback to support transmit beamforming in a multiple-input multiple-output (MIMO) system are disclosed. For radio frequency (RF) calibration, a first station (STA) sends a calibration request to a second STA, and the second STA sends a sounding packet to the first STA. The first STA receives the sounding packet, performs at least one channel measurement and performs calibration based on the channel measurement. For channel state feedback, the first STA sends a channel state feedback request to the second STA. The second STA sends a sounding packet to the first STA. The first STA receives the sounding packet and performs at least one channel measurement with the sounding packet. The first STA then calculates a steering matrix for transmit beamforming based on the channel measurement.

9 Claims, 3 Drawing Sheets

U.S. PATENT DOCUMENTS

| | | | |
|---|---|---|---|
| 2006/0035643 | A1 | 2/2006 | Vook et al. |
| 2006/0165008 | A1* | 7/2006 | Li et al. .................. 370/252 |
| 2006/0203891 | A1 | 9/2006 | Sampath et al. |
| 2006/0256761 | A1* | 11/2006 | Meylan et al. ............ 370/338 |
| 2007/0129018 | A1* | 6/2007 | Trainin et al. ............. 455/69 |
| 2007/0217539 | A1* | 9/2007 | Ihm et al. ................. 375/267 |
| 2008/0125109 | A1* | 5/2008 | Larsson et al. ........... 455/424 |
| 2009/0086690 | A1* | 4/2009 | Gu et al. .................. 370/338 |

FOREIGN PATENT DOCUMENTS

| | | |
|---|---|---|
| WO | 2005/081483 | 9/2005 |
| WO | 2005/101772 | 10/2005 |
| WO | 2007/095290 | 8/2007 |

OTHER PUBLICATIONS 802.11 Working Group of the 802 Committee *IEEE P802.11n/D0.02 Draft Amendment to Standard [FOR] Information Technology-Telecommunications and information exchange between systems-Local and Metropolitan networks-Specific requirements-Part 11:Wireless LAN Medium Access Control (MAC) and Physical Layer (PHY) specifications: Enhancements for Higher Throughput*, (Feb. 2006).

Coffey, et al., "Joint Proposal: High throughput extension to the 802.11 Standard: PHY," IEEE 802.11-05/1102r4, (Jan. 13, 2006).

Erceg et al., "TGn Channel Models," IEEE 802.11-03/940r4, (May 2004).

IEEE, *IEEE P802.11n/D2.00 Draft Standard for Information Technology-Telecommunications and information exchange between systems-Local and metropolitan area networks-Specific requirements-Part 11: Wireless LAN Medium Access Control (MAC) and Physical Layer (PHY) specifications: Amendment <number>: Enhancements for Higher Throughput*, Feb. 2007.

Liu et al., "OFDM-MIMO WLAN AP Front-End Gain and Phase Mismatch Calibration", 2004 IEEE Radio and Wireless Conference, pp. 151-154, (Sep. 19-22, 2004).

Motorola, "EUTRA Downlink Pilot Requirements and Design," 3GPP R1-050714, (Aug. 29-Sep. 2, 2005).

Motorola, "Summary of MIMO schemes for EUTRA," 3GPP R1-051238, (Oct. 10-14, 2005).

Zetterberg, et al., "Performance of Multiple-Receive Multiple-Transmit Beamforming in WLAN-type Systems under Power or EIRP Constraints with Delayed Channel Estimates," (Feb. 21, 2002).

Zheng, et al. "Multiple ARQ Processes for MIMO Systems," *EURASIP Journal on Applied Signal Processing*, vol. 2004, No. 5, pp. 772-782, 2004. doi:10.1155/S1110865704311042. Available at: http://www.hindawi.com/GetArticle.aspx?doi=10.1155/S1110865704311042&e=cta.

* cited by examiner

METHOD AND APPARATUS FOR CALIBRATION AND CHANNEL STATE FEEDBACK TO SUPPORT TRANSMIT BEAMFORMING IN A MIMO SYSTEM

CROSS REFERENCE TO RELATED APPLICATIONS

This application claims the benefit of U.S. provisional application Nos. 60/777,835 filed Mar. 1, 2006, 60/780,623 filed Mar. 9, 2006, and 60/839,846 filed Aug. 24, 2006 which are incorporated by reference as if fully set forth.

FIELD OF INVENTION

The present invention is related to wireless communication systems. More particularly, the present invention is related to a method and apparatus for calibration and channel state feedback to support transmit beamforming in a multiple-input multiple-output (MIMO) system.

BACKGROUND

In order to support a high-data-rate, low-latency, packet-optimized wireless system with increased coverage and capacity, a long term evolution (LTE) of the third generation (3G) system, (i.e., evolved universal terrestrial radio access (E-UTRA)), is currently being developed. In LTE, orthogonal frequency division multiple access (OFDMA) and single carrier frequency division multiple access (SC-FDMA) are proposed air interface technologies to be used in the downlink and uplink transmissions, respectively.

Meanwhile, a wideband code division multiple access (WCDMA)-based evolution of the conventional universal mobile telecommunication system (UMTS), (i.e., evolved high speed packet access (HSPA+)), is also proposed.

Use of multiple antennas at a base station and/or a wireless transmit/receive unit (WTRU) enhances system performance. In the downlink, specifically, these antennas can be used to provide transmit diversity and/or beamforming. The combination of multiple transmit and receive antennas may increase throughput without the need for additional power or bandwidth. There are two main multiple antenna technologies, namely beamforming and MIMO. Both are proposed to be used in LTE and HSPA+ systems as well as other wireless systems such as a wireless local access network (WLAN).

A base station generates a steering matrix for transmit beamforming. In order for the base station to calculate an appropriate steering matrix to a particular WTRU, the base station needs to have an accurate estimate of the channel state information (CSI) to that WTRU. However, differences in the radio frequency (RF) drift and impairments between several transmission radios of a multiple-antenna transmitter may cause severe degradation in performance of transmit beamforming and MIMO. Therefore, calibration should be performed to ensure adequate performance.

In a time division duplex (TDD) mode, differences in transmit and receive chains in a base station and a WTRU destroy the inherent reciprocity of the wireless channel. Thus, the main purpose of RF calibration in a TDD mode is to remove the differences in transmit and receive chains and enhance reciprocity in the observed baseband-to-baseband channels. These differences lead to differing calibration approaches.

Currently, there is no control and signaling procedure to support channel state estimation and RF calibration in LTE or HSPA standards when transmit beamforming is used.

SUMMARY

The present invention is related to a method and apparatus for calibration and channel state feedback to support transmit beamforming in a MIMO system. For RF calibration, a first station (STA) sends a calibration request to a second STA, and the second STA sends a sounding packet to the first STA. The first STA receives the sounding packet, performs at least one channel measurement and performs calibration based on the channel measurement. Alternatively, the first STA and the second STA may exchange sounding packets and the second STA may send channel measurement to the first STA. The first STA then calculates calibration matrices for the first and second STAs and sends the calibration matrix for the second STA to the second STA. The first STA and the second STA then apply the calibration matrix, respectively.

For channel state feedback, the first STA sends a channel state feedback request to the second STA. The second STA sends a sounding packet to the first STA. The first STA receives the sounding packet and performs at least one channel measurement with the sounding packet. The first STA then calculates a steering matrix for transmit beamforming based on the channel measurement.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "station (STA)" includes but is not limited to a user equipment (UE), a WTRU, a fixed or mobile subscriber unit, a pager, a cellular telephone, a personal digital assistant (PDA), a computer, a base station, a Node-B, a site controller, an access point (AP), or any other type of device capable of operating in a wireless environment.

The present invention provides procedures for channel state feedback and RF calibration to support transmit beamforming in an LTE or HSPA+ system. The RF calibration is needed for TDD systems.

Figure 1:
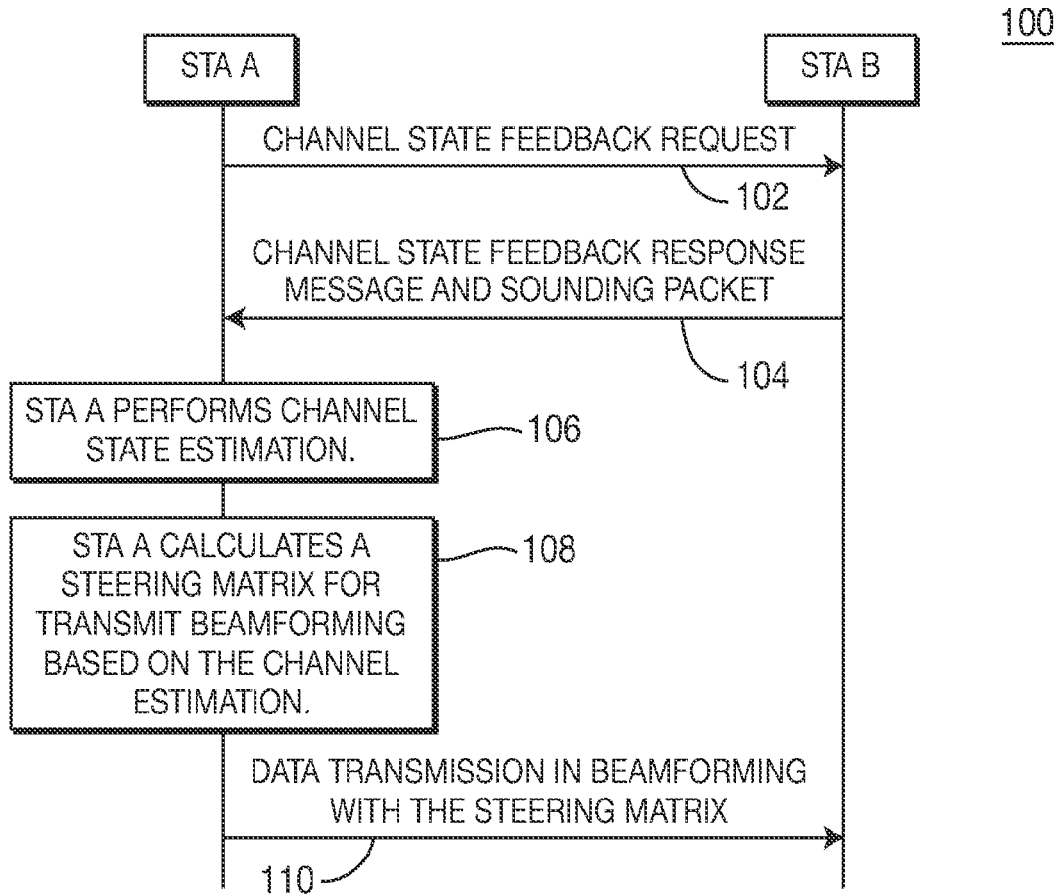
FIG. 1 is a signaling diagram of a process for obtaining CSI in a TDD mode in accordance with the present invention.

FIG. 1 is a signaling diagram of a process 100 for obtaining CSI in a TDD mode in accordance with the present invention. STA A sends a channel state feedback request to STA B to obtain CSI (step 102). The channel state feedback request may be a higher layer message such as a radio resource control (RRC) message or a medium access control (MAC) message, (i.e., as an in-band signaling with a transport block), or may be a physical layer control message transmitted via a physical layer control channel. When the channel state feedback request is sent through a physical layer control channel, it may be put into either a shared control part or a dedicated control part. The channel state feedback request may be explicitly or implicitly signaled. The channel state feedback request may be at a certain fixed position of a packet header, (MAC or physical layer header), with at least one bit to indicate the request.

Upon receipt of the channel state feedback request, STA B sends a sounding packet to STA A (step 104). The sounding packet is transmitted not-steered to STA A. The sounding packet may be any type of packet. The sounding packet may be a data packet coming from a higher layer or it may be a physical layer packet. The sounding packet must be sent via properly modulated antennas to prevent undesirable beamforming effects, (e.g., cyclic delay diversity). In transmission of the sounding packet, each transmit antenna is assigned to an orthogonal sounding data, (e.g., pilot symbols, training sequences, preambles or the like), so that the sounding data is used for the MIMO channel estimation at STA A.

STA B may send a channel state feedback response message along with the sounding packet. The channel state feedback response message may be combined with the sounding packet or separated from the sounding packet. The channel state feedback response message and the sounding packet may be transmitted using different mechanisms, (e.g., association with a codeword, data, or physical channel). When the channel state feedback response message is combined with the sounding packet, the channel state feedback response may be explicitly or implicitly signaled to STA A.

STA A receives the sounding packet and performs MIMO channel estimation with the sounding packet (step 106). STA A then calculates a steering matrix for transmit beamforming based on the MIMO channel estimation and uses the steering matrix in transmission of a packet (or packets) to STA B (steps 108, 110). The steps 102-108 may be repeated for ongoing transmissions.

Figure 2:
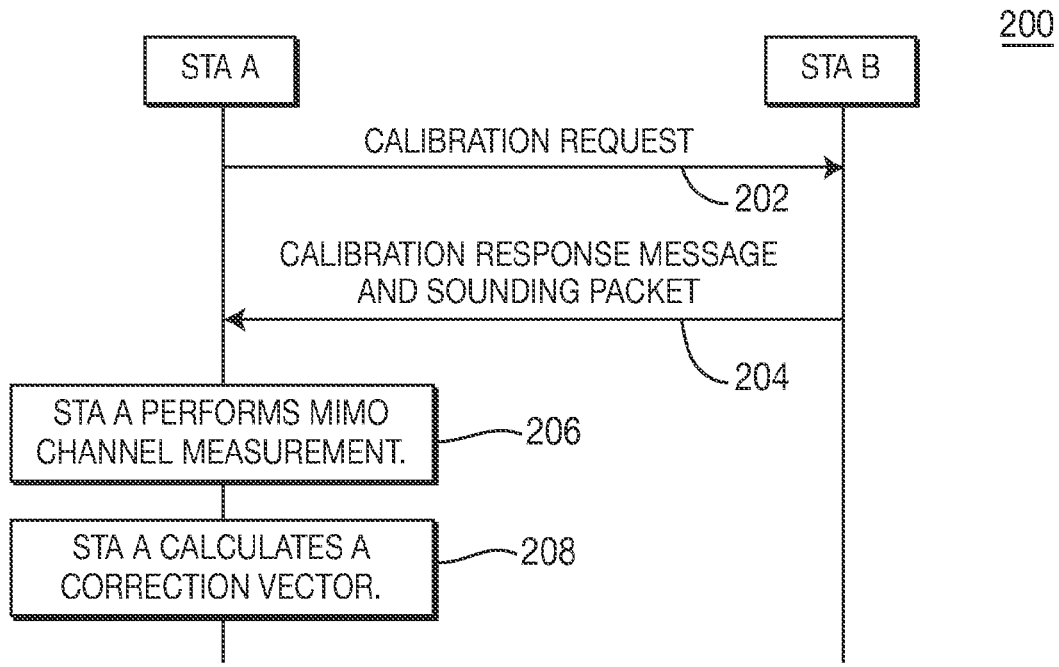
FIG. 2 is a signaling diagram of a process for calibration in a TDD mode in accordance with the present invention.

FIG. 2 is a signaling diagram of a process 200 for calibration in a TDD mode in accordance with the present invention. STA A sends a calibration request message to STA B to initiate a calibration procedure (step 202). STA B is informed of the number of transmit antennas of STA A either prior to the transmission of the calibration request message or simultaneously with the calibration request message.

The calibration request message may be sent as a higher layer message or a MAC layer message, (i.e., as an in-band signaling with a transport block). Alternatively, the calibration request message may be sent as a physical layer control message via a physical layer control channel. When the calibration request message is sent through the physical layer control channel, the calibration request message may be put into either a shared control part or a dedicated control part. The calibration request message may be at a certain fixed position of a MAC or physical layer header with at least one bit to indicate the request. The calibration request message may be sent via a broadcast channel to all STAs on a periodic basis. The period is a configurable parameter.

After receiving the calibration request, STA B sends a sounding packet to STA A along with a calibration response message (step 204). The sounding packet may be any type of packet. The sounding packet may be a special packet dedicated for the sounding purpose or may be a data packet having the nature for the sounding purpose. The sounding packet may be a data packet coming from a higher layer, or the sounding packet may be a physical layer packet. The sounding packet must be sent via properly modulated antennas to prevent undesirable beamforming effects, (e.g., cyclic delay diversity). In transmission of the sounding packet, an orthogonal sounding data, (e.g., pilot symbols, training sequences, preambles or the like) is transmitted via each of the antennas so that the sounding data is used for the MIMO channel estimation at STA A.

After receiving the sounding packet from STA B, STA A performs MIMO channel measurement (step 206). STA A then calculates a correction vector for the channel based on the MIMO channel measurement and applies it for calibration at STA A (step 208). STA A may send a correction vector to STA B for calibration at STA B.

Alternatively, STA A may send a sounding packet along with the calibration request at step 202. In this case, STA B performs MIMO channel measurement with the sounding packet transmitted from STA A and sends a channel measurement report along with the sounding packet to STA A at step 204. STA A then calculates the correction vector based on the two MIMO channel measurements calculated by STA A and STA B at step 206. STA B may calculate a correction vector on its own using the sounding packet transmitted by STA A.

Figure 3:
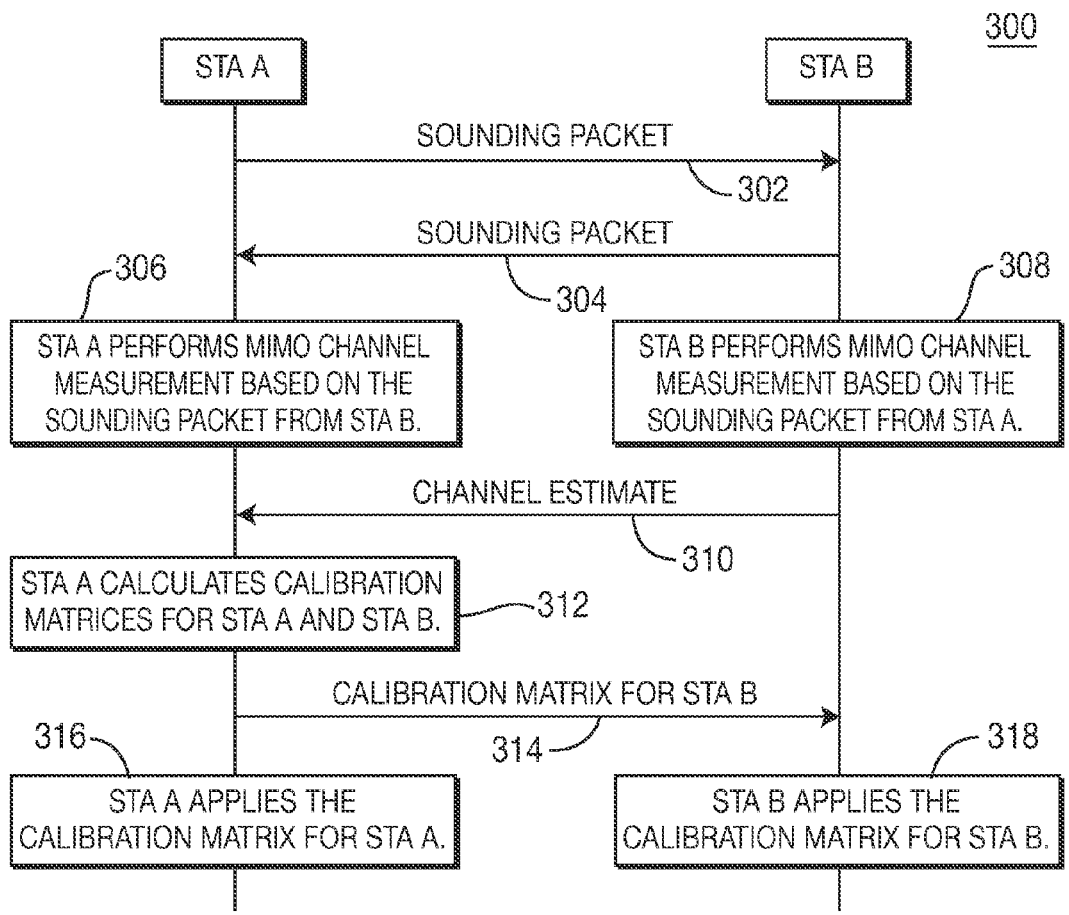
FIG. 3 is a signaling diagram of a process for calibration in accordance with another embodiment of the present invention.

Methods for computing calibration matrices based upon measurements of the sounding packet are explained with reference to FIG. 3. FIG. 3 is a signaling diagram of a process 300 for computing calibration matrices in accordance with the present invention. In order to regain reciprocity, a calibration matrix is inserted at each end of the link to alter the overall gain and phase properties. This may be done on a per-subcarrier basis. The calibration may be performed by both STAs to ensure that the effective channel, including the RF chains as modified by the calibration, is reciprocal.

The following notations will be used hereinafter:

$H_{AB}$, $H_{BA}$: intrinsic MIMO channel (RF-to-RF) from STA A to STA B and from STA B to STA A;

$\tilde{H}_{AB}$, $\tilde{H}_{BA}$: effective channel before calibration from STA A to STA B and from STA B to STA A;

$\hat{H}_{AB}$, $\hat{H}_{BA}$: calibrated channel from STA A to STA B and from STA B to STA A;

$K_{A,Tx}$, $K_{B,Tx}$: calibration matrices as applied on STA A and STA B;

$C_{A,Tx}$, $C_{A,Rx}$: transmit and receive gain matrices at STA A; and $C_{B,Tx}$, $C_{B,Rx}$: transmit and receive gain matrices at STA B.

Referring to FIG. 3, after initiation of the calibration procedure, (either by STA A or STA B), STA A sends a sounding packet to STA B which includes a training sequence, (e.g., a high throughput long training field (HT-LTF)), that allows STA B to calculate a channel estimate $\tilde{H}_{AB}$ (step 302). STA B also transmits a sounding packet to STA A which includes a training sequence that allows STA A to calculate a channel estimate $\tilde{H}_{BA}$ (step 304). Steps 302 and 304 must occur over a sufficiently short period of time that the channel does not change over the interval.

STA A then performs MIMO channel measurement based on the sounding packet from STA B to calculate the channel estimate $\tilde{H}_{BA}$ (step 306). STA B also performs MIMO channel measurement based on the sounding packet from STA A to calculate the channel estimate $\tilde{H}_{AB}$ (step 308). STA B then sends the channel estimate $\tilde{H}_{AB}$ to STA A (step 310).

STA A uses the channel estimates $\tilde{H}_{BA}$ and $\tilde{H}_{AB}$ to compute the calibration matrices $K_{A,Tx}$ and $K_{B,Tx}$ for STA A and STA B, respectively (step 312). STA A sends the calibration matrix $K_{B,TX}$ to STA B (step 314). STA A and STA B apply the calibration matrices $K_{A,Tx}$ and $K_{B,Tx}$, respectively (steps 316, 318).

Figure 4A:
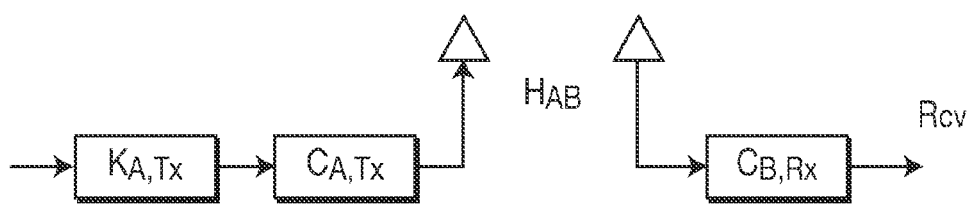
FIGS. 4A and 4B show channel models for transmit side calibration for a channel from STA A to STA B and from STA B to STA A, respectively.
Figure 4B:
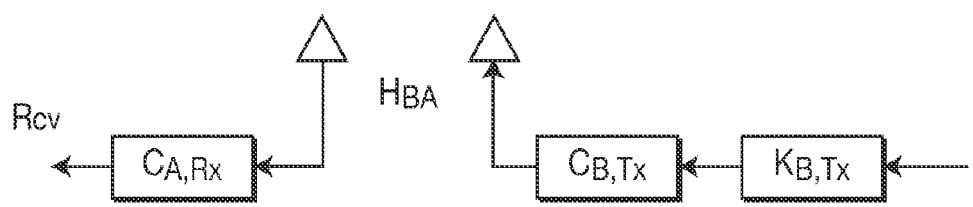

FIGS. 4A and 4B show channel models for transmit side calibration for a channel from STA A to STA B and from STA B to STA A, respectively. Before calibration, the effective channel from STA A to STA B is as follows:

$$\tilde{H}_{AB} = C_{B,Rx} H_{AB} C_{A,Tx};$$ Equation (1)

and the effective channel before calibration from STA B to STA A is as follows:

$$\tilde{H}_{BA} = C_{A,Rx} H_{BA} C_{B,Tx}.$$ Equation (2)

In general, because of the diagonal gain matrices C, the effective channels are not reciprocal such that $\tilde{H}_{AB} \neq (\tilde{H}_{BA})^T$.

The transmit-side calibration problem is to find diagonal calibration matrices $K_{A,Tx}$, $K_{B,Tx}$ to be applied on the transmit side of the respective STAs to restore the reciprocity of the effective channel such that $\hat{H}_{AB} = (\hat{H}_{BA})^T$. Once the calibration matrices are applied, it results:

$$\hat{H}_{AB} = \tilde{H}_{AB} K_{A,Tx} = C_{B,Rx} H_{AB} C_{A,Tx} K_{A,Tx};$$ Equation (3)

$$\hat{H}_{BA} = \tilde{H}_{BA} K_{B,Tx} = C_{A,Rx} H_{BA} C_{B,Tx} K_{B,Tx}.$$ Equation (4)

It is assumed that $\tilde{H}_{AB}$ and $\tilde{H}_{BA}$ are known perfectly at both STAs after the sounding packet exchange. The mathematical problem becomes that of finding $K_{A,Tx}$, $K_{B,Tx}$ so that $\hat{H}_{AB} = (\hat{H}_{BA})^T$, or:

$$C_{B,Rx} H_{AB} C_{A,Tx} K_{A,Tx} = (C_{A,Rx} H_{BA} C_{B,Tx} K_{B,Tx})^T.$$ Equation (5)

Since $H_{AB} = (H_{BA})^T$, this is equivalent to $$C_{B,Rx} H_{AB} C_{A,Tx} K_{A,Tx} = (K_{B,Tx})^T (C_{B,Tx})^T H_{AB} (C_{A,Rx})^T;$$ Equation (6)

or, since the transpose of a diagonal matrix is the matrix itself:

$$C_{B,Rx} H_{AB} C_{A,Tx} K_{A,Tx} = K_{B,Tx} C_{B,Tx} H_{AB} C_{A,Rx}.$$ Equation (7)

This can be re-written as follows:

$$H_{AB} C_{A,Tx} K_{A,Tx} (C_{A,Rx})^{-1} = (C_{B,Rx})^{-1} K_{B,Tx} C_{B,Tx} H_{AB};$$ Equation (8)

and it is clear that if the calibration matrices satisfy:

$$K_{A,Tx} = (C_{A,Tx})^{-1} C_{A,Rx};$$ Equation (9)

and $$K_{B,Tx} = C_{B,Rx} (C_{B,Tx})^{-1};$$ Equation (10)

Equation (8), and hence Equation (6), is satisfied and the calibrated channels are reciprocal, $\hat{H}_{AB} = (\hat{H}_{BA})^T$.

The calibration matrices $K_{A,Tx}$, $K_{B,Tx}$ are independent of the MIMO channel $H_{AB}$. Thus, the calibration process only has to be performed infrequently assuming the gain matrices drift slowly.

The calibration matrices, $K_{A,Tx}$, $K_{B,Tx}$ are unique up to within identical constant multipliers. This can be seen from Equation (8). Indeed Equation (8) has the form of:

$$H_{AB} D_1 = D_2 H_{AB};$$ Equation (11)

where the diagonal matrices $D_1$ and $D_2$ are given by:

$$D_1 = C_{A,Tx} K_{A,Tx} (C_{A,Rx})^{-1};$$ Equation (12)

$$D_2 = (C_{B,Rx})^{-1} K_{B,Tx} C_{B,Tx}.$$ Equation (13)

In Equation (11), the $i^{th}$ diagonal element, $d_{ii}^1$ of $D_1$ has the effect of multiplying the $i^{th}$ column of $H_{AB}$ by $d_{ii}^1$, and the $j^{th}$ diagonal element, $d_{jj}^2$ of $D_2$ has the effect of multiplying the $j^{th}$ row of $H_{AB}$ by $d_{jj}^2$. If the right and left hand sides of Equation (11) are to be equal, it is not difficult to see that $D_1$ and $D_2$ must have the form:

$$D_1 = \alpha I_N^1;$$ Equation (14)

$$D_2 = \alpha I_N^2;$$ Equation (15)

where $\alpha$ is some constant, and $I_N^1$ and $I_N^2$ are identity matrices of size $N_1$ and $N_2$, with $N_1$ and $N_2$ being the sizes of $D_1$ and $D_2$.

From Equation (11), for example, equating the "1,1" element of the left and right hand sides yields $h_{11} d_{11}^1 = d_{11}^2 h_{11}$ so that $d_{11}^1 = d_{11}^2$. Next, equating the "1,2" element of both sides yields $h_{12} d_{22}^1 = d_{11}^2 h_{12}$ so that $d_{22}^1 = d_{11}^2 = d_{11}^1$. Continuing in this way, all the diagonal elements of $D_1$ and $D_2$ must be equal, and equal to each other, which result in Equations (14) and (15). Using Equations (14) and (15) in Equations (12) and (13):

$$K_{A,Tx} = \alpha (C_{A,Tx})^{-1} C_{A,Rx};$$ Equation (16)

and, $$K_{B,Tx} = \alpha C_{B,Rx} (C_{B,Tx})^{-1};$$ Equation (17)

and the calibration matrices, $K_{A,Tx}$, $K_{B,Tx}$ are unique up to within identical constant multipliers.

Using Equations (3) and (4), it can be written that $\hat{H}_{AB} = (\hat{H}_{BA})^T$ which entails:

$$\tilde{H}_{AB} K_{A,Tx} = K_{B,Tx} (\tilde{H}_{BA})^T.$$ Equation (18)

If the matrices $\tilde{H}_{AB}$ and $\tilde{H}_{BA}$ are measured exactly, finding $K_{A,Tx}$ and $K_{B,Tx}$ is a simple matter of equating various elements of the right and left hand sides of Equation (18). However, if there is a measurement error in $\tilde{H}_{AB}$ and $\tilde{H}_{BA}$, a more robust approximate method must be found. A natural method would be to choose diagonal matrices $K_{A,Tx}$ and $K_{B,Tx}$ to minimize the sum of squares of all the elements of the matrix as follows:

$$\tilde{H}_{AB} K_{A,Tx} - K_{B,Tx} (\tilde{H}_{BA})^T;$$ Equation (19)

subject to some constraint which ensures that the zero solution is excluded. A convenient constraint is to require the sum of squares of the diagonal elements of $K_{A,Tx}$ together with those of $K_{B,Tx}$ to be unity. Four embodiments for doing this are provided in the present invention.

A first embodiment—one-shot scheme.

Apply the vec operation to the matrix in Equation (19) and use the identity, $\text{vec}(AXB) = (B^T \otimes A) \text{vec}(X)$ to get:

$$(I \otimes \tilde{H}_{AB}) \text{vec}(K_{A,Tx}) - (\tilde{H}_{BA} \otimes I) \text{vec}(K_{B,Tx}).$$ Equation (20)

Minimizing the sum of squares in the matrix of Equation (19) is equivalent to minimizing the sum of squares in the vector in Equation (20). This is because the vec operation simply re-arranges the elements of a matrix into a vector.

There is a representation of $\text{vec}(K_{A,Tx})$ that is useful. For demonstration purposes, take a 2×2 case in which:

$$K_{A,Tx} = \begin{bmatrix} a & 0 \\ 0 & b \end{bmatrix}.$$ Equation (21)

Then $\text{vec}(K_{A,Tx}) = [a\ 0\ 0\ b]^T$ can be written as follows:

$$\text{vec}(K_{A,Tx}) = \begin{bmatrix} 1 & 0 \\ 0 & 0 \\ 0 & 0 \\ 0 & 1 \end{bmatrix} \begin{bmatrix} a \\ b \end{bmatrix} = S_A d_A.$$ Equation (22)

Similarly, vec($K_{B,Tx}$)=$S_B d_B$. Suitable matrices $S_A$ and $S_B$ can be defined to perform this representation, no matter what the sizes of $K_{A,Tx}$ and $K_{B,Tx}$ are. Therefore, Equation (20) can be rewritten as follows:

$$(I \otimes \tilde{H}_{AB})S_A d_A = (\tilde{H}_{BA} \otimes I)S_B d_B. \quad \text{Equation (23)}$$

By defining a new vector $x=[(d_A)^T (d_B)^T]^T$, this becomes:

$$[(I \otimes \tilde{H}_{AB})S_A - (\tilde{H}_{BA} \otimes I)S_B]x. \quad \text{Equation (24)}$$

The goal is to choose x to minimize the following quantity:

$$E=\|[(I \otimes \tilde{H}_{AB})S_A - (\tilde{H}_{BA} \otimes I)S_B]x\|, \quad \text{Equation (25)}$$

subject to $\|x\|=1$. By defining W as follows:

$$W=[(I \otimes \tilde{H}_{AB})S_A - (\tilde{H}_{BA} \otimes I)S_B], \quad \text{Equation (26)}$$

the goal is to find x to minimize:

$$E=\|Wx\|, \quad \text{Equation (27)}$$

subject to $\|x\|=1$.

The solution of this problem is well known. The vector x should be the eigenvector of (W*W) corresponding to the smallest eigenvector. The resulting vector x contains the diagonal elements of the desired matrices $K_{A,Tx}$ and $K_{B,Tx}$ defined up to within an arbitrary common constant multiplier.

A second embodiment—two-shot scheme.

The ideal solution would result in:

$$(I \otimes \tilde{H}_{AB})S_A d_A = (\tilde{H}_{BA} \otimes I)S_B d_B. \quad \text{Equation (28)}$$

To simplify the notation, let $(I \otimes \tilde{H}_{AB})S_A = R_A$ and $(\tilde{H}_{BA} \otimes I)S_B = R_B$. Equation (28) then becomes as follows:

$$R_A d_A = R_B d_B. \quad \text{Equation (29)}$$

In this approach, it is assumed that $d_B$ is known. A least squares (LS) solution for $d_A$ is then as follows:

$$d_A^{(LS)} = (R_A^H R_A)^{-1} R_A^H R_B d_B; \quad \text{Equation (30)}$$

and it minimizes:

$$\varepsilon(d_B) = \|R_A d_A^{(LS)} - R_B d_B\| \quad \text{Equation (31)}$$
$$= \|R_A (R_A^H R_A)^{-1} R_A^H R_B d_B - R_B d_B\|$$
$$= \|P_{R_A}^\perp R_B d_B\|$$
$$= \|Q d_B\|;$$

where $P_{R_A}^\perp$ is a projector, which projects to a subspace orthogonal to the subspace spanned by the columns of $R_A$.

Then, the optimum $d_B$ is the one that minimizes $\epsilon(d_B)$. Again, $\hat{d}_B$ is the eigenvector corresponding to the smallest eigenvalue of $Q^H Q$. After $\hat{d}_B$ is obtained, $\hat{d}_A$ is computed by $\hat{d}_A = (R_A^H R_A)^{-1} R_A^H R_B \hat{d}_B$.

$\hat{d}_A$ and $\hat{d}_B$ minimize $\|R_A d_A - R_B d_B\|$ and equivalently $\|\tilde{H}_{AB} K_{A,Tx} - K_{B,Tx} (\tilde{H}_{BA})^T\|_F$.

A third embodiment—iterative scheme.

The LS method may be applied iteratively. The solution obtained by using the iterative scheme also minimizes $\|R_A d_A - R_B d_B\|$. First, given an initial $d_B^{(0)}$, solve the LS problem as follows:

$$d_A^{(0)} = \min_{d_A} \arg\|R_A d_A - R_B d_B^{(0)}\| \quad \text{Equation (32)}$$
$$= (R_A^H R_A)^{-1} R_A^H R_B d_B^{(0)}.$$

Then, using the obtained solution $d_A^{(0)}$ to update $d_B$, $$d_B^{(1)} = \min_{d_B} \arg\|R_A d_A^{(0)} - R_B d_B\| \quad \text{Equation (33)}$$
$$= (R_B^H R_B)^{-1} R_B^H R_A d_A^{(0)}.$$

The iteration is repeated until a prescribed criterion is met. One way to avoid converging to a trivial solution is to constrain $d_B^{(n)}$ to be unit norm at each step of iteration.

A fourth embodiment—suboptimal scheme.

This suboptimal scheme attempts to compromise performance with complexity. Equation (18), $\tilde{H}_{AB} K_{A,Tx} = K_{B,Tx} (\tilde{H}_{BA})^T$, is the equation to be solved. If the channels are perfectly known, one way to solve it is to expand the equation, and equate the matrix element one by one. However, if there is a channel estimation error, because the equal sign may not hold, the aforementioned method fails. The reason is that equating some of the elements may lead to contradiction of others. Although, some of the elements may be equated and then the difference is minimized, this leads to a problem with smaller dimensions. Because of the smaller degrees of freedom than the original problem, this scheme is not optimal. In other words, the Frobenius norm of the error, $\|\tilde{H}_{AB} K_{A,Tx} - K_{B,Tx} (\tilde{H}_{BA})^T\|_F$, will be bigger than the previous three embodiments.

Suppose that $\tilde{H}_{AB}$ is of size $N_{Tx} \times N_{Rx}$, the ith columns of $\tilde{H}_{AB}$ is $a_i = [a_{1i} \ldots a_{N_{Rx} i}]^T$, similarly the jth row of $(\tilde{H}_{BA})^T$ is $b_j^T = [b_{j1} \ldots b_{jN_{Tx}}]$. Both sides of Equation (2) becomes as follows:

$$[a_1 \cdots a_{N_{Tx}}] \cdot \begin{bmatrix} d_1 & & 0 \\ & \ddots & \\ 0 & & d_{N_{Tx}} \end{bmatrix}; \quad \text{Equation (34)}$$

$$\begin{bmatrix} d_{N_{Tx}+1} & & 0 \\ & \ddots & \\ 0 & & d_{N_{Tx}+N_{Rx}} \end{bmatrix} \cdot \begin{bmatrix} \underline{b}_1^T \\ \vdots \\ \underline{b}_{N_{Rx}}^T \end{bmatrix} \quad \text{Equation (35)}$$

Without loss of generality, let $d_1 = 1$, then let the constraints be that the first columns of Equations (34) and (35) are equal.

$$\begin{bmatrix} a_{11} \\ \vdots \\ a_{N_{Rx} 1} \end{bmatrix} = \begin{bmatrix} b_{11} \cdot d_{N_{Tx}+1} \\ \vdots \\ b_{N_{Rx}} \cdot d_{N_{Tx}+N_{Rx}} \end{bmatrix}.$$

By doing this, $$\begin{bmatrix} d_{N_{Tx}+1} \\ \vdots \\ d_{N_{Tx}+N_{Rx}} \end{bmatrix} = \begin{bmatrix} b_{11}/a_{11} \\ \vdots \\ b_{N_{Rx}}/a_{N_{Rx}} \end{bmatrix}$$

can be solved. The error matrix of Equations (34) and (35) is:

$$E = \begin{bmatrix} 0 & (a_{12} \cdot d_2 - \alpha_{11}) & \cdots & (a_{1N_{Tx}} \cdot d_{N_{Tx}} - \alpha_{1P}) \\ \vdots & \vdots & \ddots & \vdots \\ 0 & (a_{N_{Rx}2} \cdot d_2 - \alpha_{N_{Rx}1}) & \cdots & (a_{N_{Rx}N_{Tx}} \cdot d_{N_{Tx}} - \alpha_{N_{Rx}P}) \end{bmatrix};$$

Equation (36)

where $P = N_{Tx} + N_{Rx} - 1$ and $\alpha_{ij} = b_{i,j+1} \cdot d_{N_{Tx}+i}$.

The problem becomes to find $d_2 \ldots d_{N_{Rx}}$ to minimize $\|E\|^2_F$ or equivalently $\|\text{vec}(E)\|^2$. Neglect the first column of E, call the resulting matrix V $$V = \begin{bmatrix} a_{12} \cdot d_2 - \alpha_{11} \\ a_{22} \cdot d_2 - \alpha_{21} \\ \vdots \\ a_{N_{Rx}N_{Tx}} \cdot d_{N_{Tx}} - \alpha_{N_{Rx}P} \end{bmatrix} = \begin{bmatrix} a_{12} & 0 & \cdots & 0 & 0 \\ a_{22} & 0 & \cdots & 0 & 0 \\ \vdots & \ddots & \ddots & & \vdots \\ 0 & & \cdots & 0 & a_{(N_{Tx}-1)N_{Rx}} \\ 0 & & \cdots & 0 & a_{N_{Tx}N_{Rx}} \end{bmatrix} \begin{bmatrix} d_2 \\ \vdots \\ d_{N_{Tx}} \end{bmatrix} - \begin{bmatrix} \alpha_{11} \\ \vdots \\ \alpha_{N_{Rx}P} \end{bmatrix}$$

$$= A \cdot \underline{d} - \underline{z}.$$

Equation (37)

The problem then may be solved by the well known LS method.

$$\hat{\underline{d}} = \min_{\underline{d}} \arg \|A \cdot \underline{d} - \underline{z}\|^2 = (A^*A)^{-1} A^* \underline{z}$$

Figure 5:
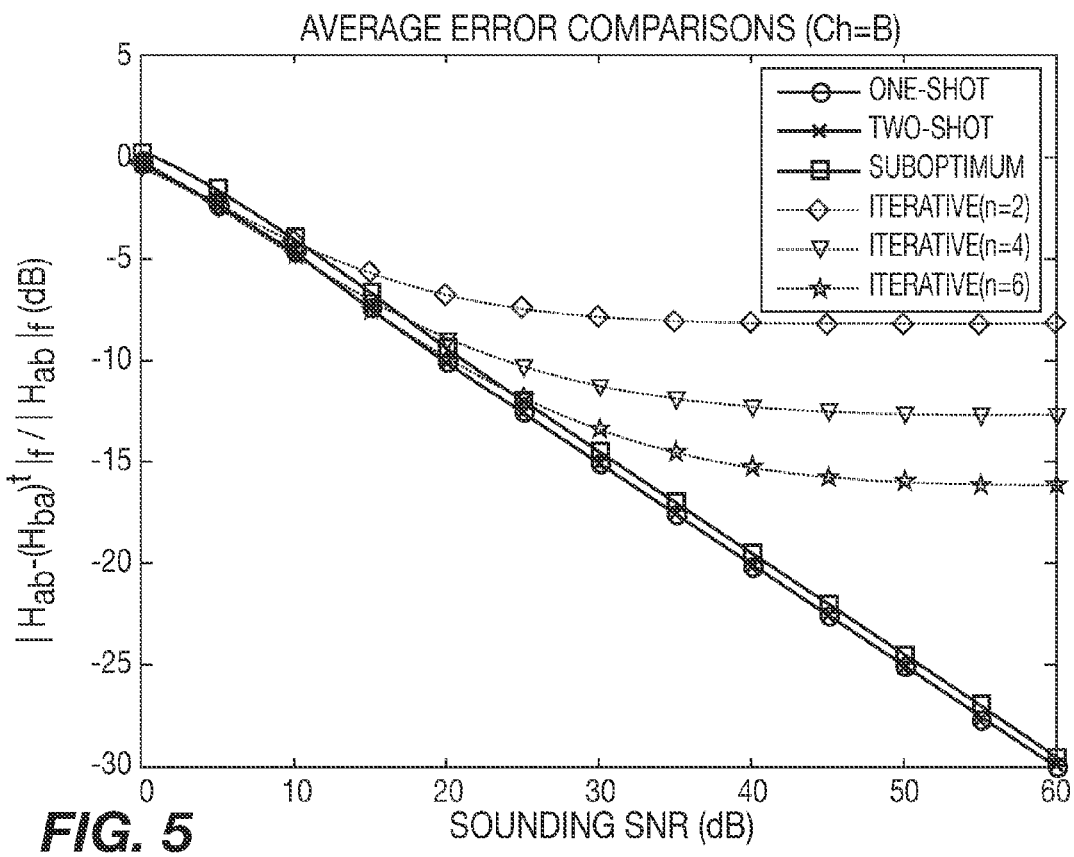
FIGS. 5 and 6 show simulation results for comparing calibration matrix computation schemes in accordance with the present invention.
Figure 6:
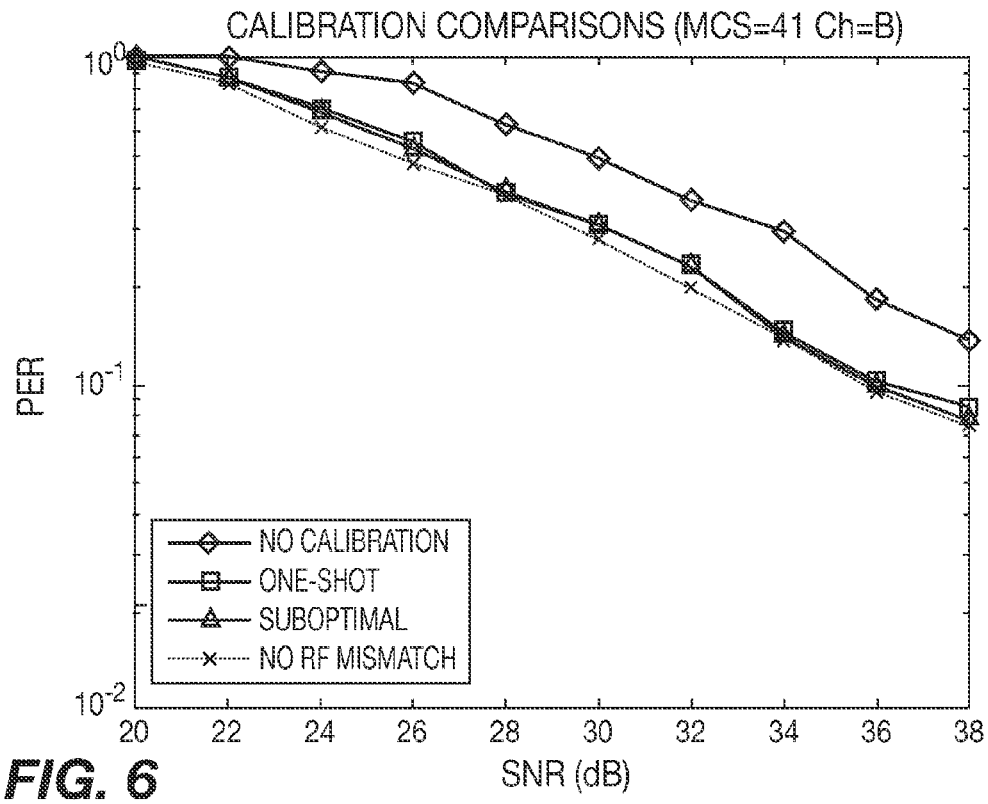

An example performance comparison of the foregoing embodiments is described for a 2×2 matrix channel hereinafter. The system simulated here is a MIMO orthogonal frequency division multiplexing (OFDM) system for an IEEE 802.11n TGn. FIGS. 5 and 6 show simulation results for comparing calibration matrix computation schemes in accordance with the present invention.

The overall transmitter data path processing is also defined in the same reference, and includes convolutional coding, spatial parsing into several spatial streams, frequency interleaving over 64 subcarriers, QAM modulation and Unitary mapping of the spatial streams onto the transmit antennas. The receiver implemented here includes MMSE symbol demodulation followed by soft demapping to the bit level soft decisions, and Viterbi decoding. In these figures, the channel is the TGn channel model B.

FIG. 5 plots a measure of reciprocity, after calibration, for the different schemes. The reciprocity measure used is the norm of the difference between the forward channel and the transpose of the reverse channel, after calibration, and normalized to the norm of the forward channel:

$$E = \frac{\|\hat{H}_{AB} - (\hat{H}_{BA})^T\|_F}{\|\hat{H}_{AB}\|_F}.$$

Equation (38)

The transmit and receive gain matrices for this example are:

$$C_{A,Tx} = \begin{bmatrix} 0.705e^{-j0.6359} & 0 \\ 0 & 0.5753e^{-j0.1711} \end{bmatrix}$$

$$C_{A,Rx} = \begin{bmatrix} 0.3537e^{-j1.491} & 0 \\ 0 & 1.4967e^{j1.1313} \end{bmatrix}$$

$$C_{B,Tx} = \begin{bmatrix} 1.555e^{j1.2318} & 0 \\ 0 & 2.2397e^{-j0.2722} \end{bmatrix}$$

$$C_{B,Rx} = \begin{bmatrix} 1.8121e^{-j0.5632} & 0 \\ 0 & 1.6716e^{j0.713} \end{bmatrix}.$$

To generate FIG. 5 a sounding packet exchange is first done to perform the calibration and obtain $K_{A,Tx}$, $K_{B,Tx}$. One hundred (100) random channels are then generated and the average value of this measure Equation (32) in dB is computed. This average measure is plotted vs. the sounding packet signal-to-noise ratio (SNR).

It can be seen that the one-shot and two-shot schemes perform equally well, as they both yield the optimum solution, while the suboptimum scheme tracks the optimum performance fairly well, with a slight loss in performance using this measure. The performance of the iterative scheme bottoms out as the sounding SNR increases, with the floor depending on the number of iterations.

FIG. 6 shows the packet error rate for MCS number 41 of the TGn channel B, when the one-shot and suboptimal calibration procedures are incorporated. MCS 41 uses two spatial data streams, one with 256 QAM and one with 16-QAM. Rate ¾ convolutional encoding is used to encode the data. In the simulation, STA A transmitter performs beamforming as follows. For each subcarrier, a singular value decomposition is performed on the calibrated channel matrix $\hat{H}_{BA}$ which it has measured from the latest incoming packet from STA B:

$$\hat{H}_{BA} = UDV^H.$$

Equation (39)

Next, assuming that $\hat{H}_{AB} \approx (\hat{H}_{BA})^T$, or:

$$\hat{H}_{AB} \approx V^* D^T U^T.$$

Equation (40)

STA A uses the unitary matrix U to map the spatial streams onto the two eigen-modes of the channel $\hat{H}_{AB}$, with the 256 QAM stream on eigen-mode with the largest eigenvalue. In generating FIG. 6, each new packet is treated as a new random trial in which the following steps are carried out. First, the matrices $C_{A,Tx}$, $C_{A,Rx}$, $C_{B,Tx}$, $C_{B,Rx}$ are randomly generated. These matrices are generated independently, each diagonal element with random amplitude and phase distortions from 1.0. The amplitude distortions are modeled as zero mean Gaussian random variables such that the average deviation in the amplitude is 2 dB, and the diagonal elements have random phase as well.

Next the channel is randomly generated and a sounding packet exchange takes place, followed by computation of the calibration matrices. The data packet is then transmitted using the transmit beamforming described above.

It is seen from FIG. 6 that there is a loss in performance of roughly 4 dB if no calibration is performed. Whereas both the one-shot and the suboptimal calibration procedures correct almost completely for the loss in channel reciprocity.

Table 1 below compares the computations involved in the three best performing schemes discussed above. The three schemes are listed in the order of decreasing computational cost.

TABLE 1

| | One Shot Scheme | Two Shot Scheme | Sub-optimal Scheme |
|---|---|---|---|
| Eigenvector Computation | $N_{Tx} + N_{Rx}$ | $\text{Min}\{N_{Tx}, N_{Rx}\}$ | None. $\text{Min}\{N_{Tx}, N_{Rx}\}$ Divisions |
| Inverse Matrix Computation | $N_{Tx} + N_{Rx}$ | $\text{Max}\{N_{Tx}, N_{Rx}\}$ | $\text{Min}\{N_{Tx}, N_{Rx}\}$ |

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. In a multiple-input multiple-output (MIMO) wireless communication system including a plurality of stations (STAs), a method for calibration to support transmit beamforming, the method comprising:
    a first STA sending a calibration request to a second STA;
    the second STA sending a first sounding packet to the first STA;
    the first STA sending a second sounding packet to the second STA;
    the first STA receiving the first sounding packet and performing at least one channel measurement to generate a first channel estimate estimating a channel matrix $\tilde{H}_{BA}$ of a channel from the second STA to the first STA based on the second sounding packet;
    the first STA generating a first correction vector based on the first channel estimate;
    the second STA receiving the second sounding packet and performing at least one channel measurement to generate a second channel estimate estimating a channel matrix $\tilde{H}_{AB}$ of a channel from the first STA to the second STA based on the first sounding packet;
    the second STA sending the second channel estimate to the first STA, wherein the first STA generates the second correction vector based on the first channel estimate and the second channel estimate;
    the first STA applying the first correction vector for calibration;
    the first STA sending the second correction vector to the second STA; and
    the second STA applying the second correction vector for calibration.

2. The method of claim 1 wherein the calibration request is transmitted as one of a higher layer message and a medium access control (MAC) layer message.

3. The method of claim 1 wherein the calibration request is transmitted as a physical layer control message.

4. The method of claim 3 wherein the calibration request is included in a shared control part.

5. The method of claim 3 wherein the calibration request is included in a dedicated control part.

6. The method of claim 1 wherein the sounding packet is a packet dedicated for sounding purposes.

7. The method of claim 1 wherein the sounding packet is a data packet.

8. The method of claim 1 further comprising:
    the second STA generating a correction vector based on the second channel estimate; and
    the second STA applying the correction vector for calibration.

9. The method of claim 1 comprising:
    the first STA generating a second correction vector for the second STA based on the first channel estimate and the second channel estimate;
    the first STA sending the second correction vector to the second STA; and
    the second STA applying the second correction vector for calibration.

* * * * *